United States Patent
Nylander et al.

(10) Patent No.: US 9,681,334 B2
(45) Date of Patent: Jun. 13, 2017

(54) METHODS AND APPARATUS FOR ENABLING LOAD STEERING IN HETEROGENEOUS RADIO ACCESS NETWORKS

(75) Inventors: Tomas Nylander, Varmdo (SE); Per-Daniel Stalnacke, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 215 days.

(21) Appl. No.: 14/421,803

(22) PCT Filed: Aug. 15, 2012

(86) PCT No.: PCT/EP2012/065969
§ 371 (c)(1),
(2), (4) Date: Feb. 13, 2015

(87) PCT Pub. No.: WO2014/026714
PCT Pub. Date: Feb. 20, 2014

(65) Prior Publication Data
US 2015/0237529 A1    Aug. 20, 2015

(51) Int. Cl.
*H04W 28/08* (2009.01)
*H04W 48/06* (2009.01)
*H04W 72/04* (2009.01)

(52) U.S. Cl.
CPC ......... *H04W 28/08* (2013.01); *H04W 48/06* (2013.01); *H04W 72/0486* (2013.01)

(58) Field of Classification Search
CPC . H04W 28/08; H04W 48/06; H04W 72/0486; H04W 16/08; H04W 48/02; H04W 84/045
See application file for complete search history.

(56) References Cited

U.S. PATENT DOCUMENTS

2006/0109826 A1* 5/2006 Zhang ............... H04L 63/08
                                                        370/338
2011/0125510 A1* 5/2011 Ho ................. H04W 48/02
                                                        705/1.1

(Continued)

FOREIGN PATENT DOCUMENTS

EP         2326118 A1    5/2011

OTHER PUBLICATIONS

Notification of Transmittal of the International Search Report and Written Opinion of the International Searching Authority for PCT Application No. PCT/EP2012/065969 mailed on Dec. 4, 2012; 11pgs.

*Primary Examiner* — Awet Haile
(74) *Attorney, Agent, or Firm* — Patent Portfolio Builders, PLLC

(57) ABSTRACT

According to a first aspect there is provided a method of enabling load steering between a 3rd Generation Partnership Project (3GPP) Radio Access Network (RAN) and a Wi-Fi RAN. The method comprises, at a server, generating overlap information associating one or more cells of the 3GPP RAN with one or more Access Points (AP) of the Wi-Fi RAN, wherein a cell of the 3GPP RAN is associated with an AP of the Wi-Fi RAN if it is determined that the cell overlaps with an area covered by the AP. The server then determines an off-load schedule for a cell of the 3GPP RAN, the off-load schedule indicating when an overlapping AP of the Wi-Fi RAN can reject an attempt by a user terminal to attach to the AP of the Wi-Fi RAN, and sends the off-load schedule to the Wi-Fi RAN.

20 Claims, 6 Drawing Sheets

(56) References Cited

U.S. PATENT DOCUMENTS

2011/0320588 A1 12/2011 Raleigh et al.
2012/0034922 A1 2/2012 Jones et al.

* cited by examiner

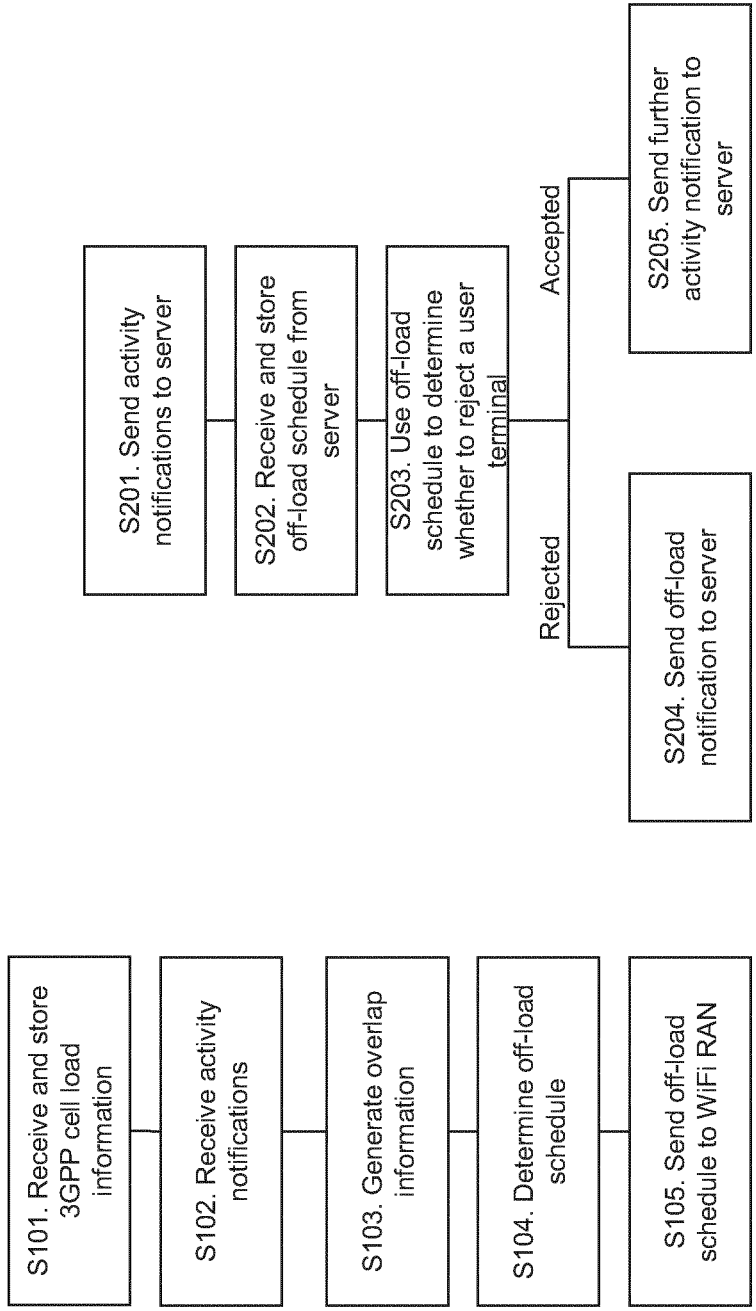

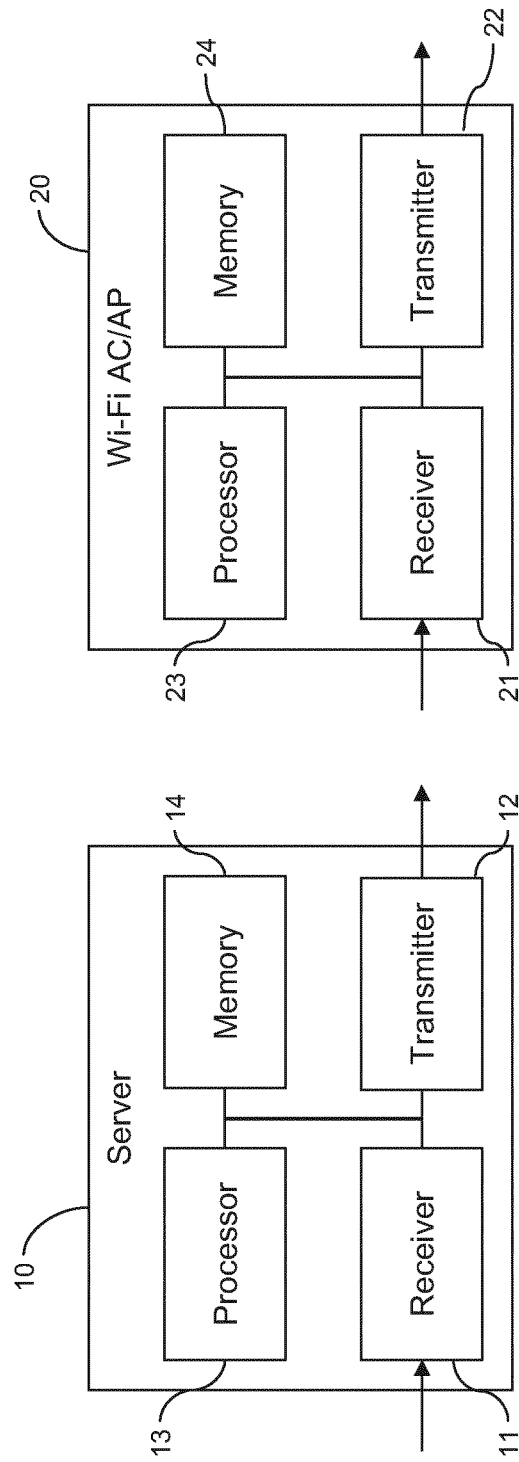

METHODS AND APPARATUS FOR ENABLING LOAD STEERING IN HETEROGENEOUS RADIO ACCESS NETWORKS

CROSS-REFERENCE TO RELATED APPLICATIONS

This application is a National stage of International Application No. PCT/EP2012/065969, filed Aug. 15, 2012, which is hereby incorporated by reference.

TECHNICAL FIELD

The present invention relates to methods and apparatus for implementing load steering in heterogeneous radio access networks (RAN). More particularly, the invention relates to methods and apparatus for implementing load steering between a 3rd Generation Partnership Project (3GPP) RAN and a Wi-Fi RAN.

BACKGROUND

Data traffic in mobile telecommunications networks is continually increasing. Consequently, operators are deploying heterogeneous access networks that make use of multiple radio access technologies (RATs) in order to provide greater capacity, particularly in high traffic areas and areas that otherwise have poor network coverage. Typically, the radio access technologies used by these heterogeneous access networks include Universal Mobile Telecommunications System (UMTS), Long Term Evolution (LTE), and Wi-Fi/WLAN. In this regard, both the UMTS and LTE standards are defined by the 3rd Generation Partnership Project (3GPP), and the relevant 3GPP standards therefore define capabilities for handling load sharing between these 3GPP RATs (i.e. between a UMTS Radio Access Network (UTRAN) and an Evolved UTRAN (EUTRAN)). In contrast, the Wi-Fi/WLAN standards are defined by the Institute of Electrical and Electronics Engineers (IEEE), and neither the IEEE standards nor the 3GPP standards define capabilities for handling load sharing between Wi-Fi/WLAN and the 3GPP RATs.

In particular, for most currently available user terminals, when the user terminal is within the coverage of both a Wi-Fi RAN/WLAN and a 3GPP RAN, the user terminal will automatically attempt to connect to the Wi-Fi RAN/WLAN and will detach from the 3GPP RAN. Therefore, the decision to move from the 3GPP RAN to the Wi-Fi RAN is made without having considered the load and/or performance of either RAN, and can result in a reduction in performance that is detrimental to both the networks and the user. In particular, having the user terminal make an uninformed decision to move from the 3GPP RAN to the Wi-Fi RAN can result in an overload in the Wi-Fi RAN and/or underutilisation of the 3GPP RAN. Moreover, as the Wi-Fi RAN and 3GPP RAN are part of separate domains that use different management systems, different paradigms, different identities etc., there is no mechanism that allows either network to determine that the performance has deteriorated due to the move from the 3GPP RAN to the Wi-Fi RAN.

SUMMARY

It is therefore an object of the present invention to provide methods and apparatus for implementing load steering between a 3GPP RAN, such as a UTRAN or an EUTRAN, and a Wi-Fi RAN.

According to a first aspect there is provided a method of enabling load steering between a 3rd Generation Partnership Project (3GPP) Radio Access Network (RAN) and a Wi-Fi RAN. The method comprises, at a server:

generating overlap information associating one or more cells of the 3GPP RAN with one or more Access Points (AP) of the Wi-Fi RAN, wherein a cell of the 3GPP RAN is associated with an AP of the Wi-Fi RAN if it is determined that the cell overlaps with an area covered by the AP;

determining an off-load schedule for a cell of the 3GPP RAN, the off-load schedule indicating when an overlapping AP of the Wi-Fi RAN can reject an attempt by a user terminal to attach to the AP of the Wi-Fi RAN; and sending the off-load schedule to the Wi-Fi RAN.

The step of generating overlap information associating one or more cells of the 3GPP RAN with one or more AP of the Wi-Fi RAN may comprise identifying when a user terminal may be active in both a cell of the 3GPP RAN and an area covered by an AP of the Wi-Fi RAN. The step of identifying when a user terminal may be active in both a cell of the 3GPP RAN and an area covered by an AP of the Wi-Fi RAN may comprise receiving an activity notification from the 3GPP RAN relating to activity of the user terminal within a 3GPP cell, receiving an activity notification from the Wi-Fi RAN relating to activity of the user terminal at an AP of the Wi-Fi RAN, and correlating a time at which the activity within the 3GPP cell occurred with a time at which the activity at the AP of the Wi-Fi RAN occurred.

The method may further comprise receiving load information from a cell of the 3GPP RAN, and using the received load information when determining the off-load schedule for the 3GPP cell.

The method may further comprise receiving an off-load notification from the Wi-Fi RAN indicating that an AP of the Wi-Fi RAN has rejected an attempt by a user terminal to attach to the Wi-Fi AP. The method may then further comprise, following receipt of an off-load notification, receiving performance information relating to the performance of the rejected user terminal within a 3GPP cell, and using the received performance information to update the overlap information accordingly. The method may also further comprise, upon receipt of a further activity notification from the 3GPP RAN relating to activity of the rejected user terminal within a 3GPP cell, determining if the overlap information associates the 3GPP cell with the AP of the Wi-Fi RAN that rejected the attempt to attach, and updating the overlap information accordingly.

According to a second aspect there is provided a method of implementing load steering between a 3GPP RAN and a Wi-Fi RAN. The method comprises, at an entity of the Wi-Fi RAN:

receiving an off-load schedule that is applicable to an AP of the Wi-Fi RAN, the off-load schedule indicating when the AP can reject an attempt by a user terminal to attach to the AP; and when a user terminal attempts to attach to the AP, using the off-load schedule to determine whether to accept or reject the user terminal.

The off-load schedule may be received from a server. The method may further comprise, prior to receiving an off-load schedule that is applicable to the AP, when a user terminal attempts to attach to the AP, generating and sending an activity notification to the server. The method may also further comprise, if the user terminal is rejected based on the off-load schedule, generating and sending an off-load notification indicating that the AP has rejected the attempt to attach to the AP.

The method may further comprise, if the user terminal is accepted, generating and sending an activity notification to the server indicating that the AP has accepted the attempt to attach to the AP.

According to a third aspect there is provided a server configured to enable load steering between a 3GPP RAN and a Wi-Fi RAN. The server comprises
  a processor configured to generate overlap information associating one or more cells of the 3GPP RAN with one or more AP of the Wi-Fi RAN, wherein a cell of the 3GPP RAN is associated with an AP of the Wi-Fi RAN if it is determined that the cell overlaps with an area covered by the AP;
  the processor being further configured to determine an off-load schedule for a cell of the 3GPP RAN, the off-load schedule indicating when an overlapping AP of the Wi-Fi RAN can reject an attempt by a user terminal to attach to the AP of the Wi-Fi RAN; and
  a transmitter configured to send the off-load schedule to the Wi-Fi RAN.

The processor may be configured to generate overlap information by identifying when a user terminal may be active in both a cell of the 3GPP RAN and at an AP cell of the Wi-Fi RAN.

The server may further comprise a receiver. The receiver may be configured to receive an activity notification from the 3GPP RAN relating to activity of the user terminal within a 3GPP cell and to receive an activity notification from the Wi-Fi RAN relating to activity of the user terminal within an area covered by an AP of the Wi-Fi RAN, and the processor may be configured to correlate a time at which the activity within the 3GPP cell occurred with a time at which the activity at the AP of the Wi-Fi RAN cell occurred.

The receiver may be configured to receive load information from a cell of the 3GPP RAN, and the processor may be configured to use the received load information when determining the off-load schedule for the 3GPP cell.

The receiver may be configured to receive an off-load notification from the Wi-Fi RAN indicating that an AP of the Wi-Fi RAN has rejected an attempt by a user terminal to attach to the Wi-Fi AP based on the off-load schedule.

The receiver may also be configured to receive performance information relating to the performance of the rejected user terminal within a 3GPP cell, and the processor may be configured to use the received performance information to update the overlap information accordingly.

The receiver may be configured to receive a further activity notification from the 3GPP RAN relating to activity of the rejected user terminal within a 3GPP cell, and the processor may be configured to determine if the overlap information associates the 3GPP cell with the AP of the Wi-Fi RAN that rejected the attempt to attach and to update the overlap information accordingly.

According to a fourth aspect there is provided an entity of a Wi-Fi RAN configured to implement load steering between a 3GPP RAN and the Wi-Fi RAN. The entity comprises:
  a receiver configured to receive an off-load schedule that is applicable to an Access Point, AP, of the Wi-Fi RAN, the off-load schedule indicating when the AP can reject an attempt by a user terminal to attach to the AP; and
  a processor configured to use the off-load schedule to determine whether to accept or reject an attempt by a user terminal to attach to the AP.

The receiver may be configured to receive the off-load schedule from a server, and the entity may then further comprise a transmitter. The processor may be configured to generate an activity notification when a user terminal attempts to attach to the AP, and the transmitter may be configured to send the activity notification to the server.

The processor may be configured to generate an off-load notification if the user terminal is rejected based on the off-load schedule, the off-load notification indicating that the AP has rejected the attempt to attach, and the transmitter may be configured to send the off-load notification to the server.

The processor may be configured to generate an activity notification if the user terminal is accepted, the activity notification indicating that the AP has accepted the attempt to attach, and the transmitter may be configured to send the activity notification to the server.

BRIEF DESCRIPTION OF THE DRAWINGS

Some embodiments of the present invention will now be described in detail with reference to the accompanying drawings, in which:

FIG. 1 is a flow diagram illustrating an example of the procedure implemented by a server in accordance with the methods described herein;

FIG. 2 is a flow diagram illustrating an example of the procedure implemented by an entity within a Wi-Fi RAN in accordance with the methods described herein;

FIG. 7 illustrates schematically an embodiment of a server configured to implement the methods described herein; and FIG. 8 illustrates schematically an embodiment of an entity of a Wi-Fi RAN configured to implement the methods described herein.

DETAILED DESCRIPTION

Figure 3:
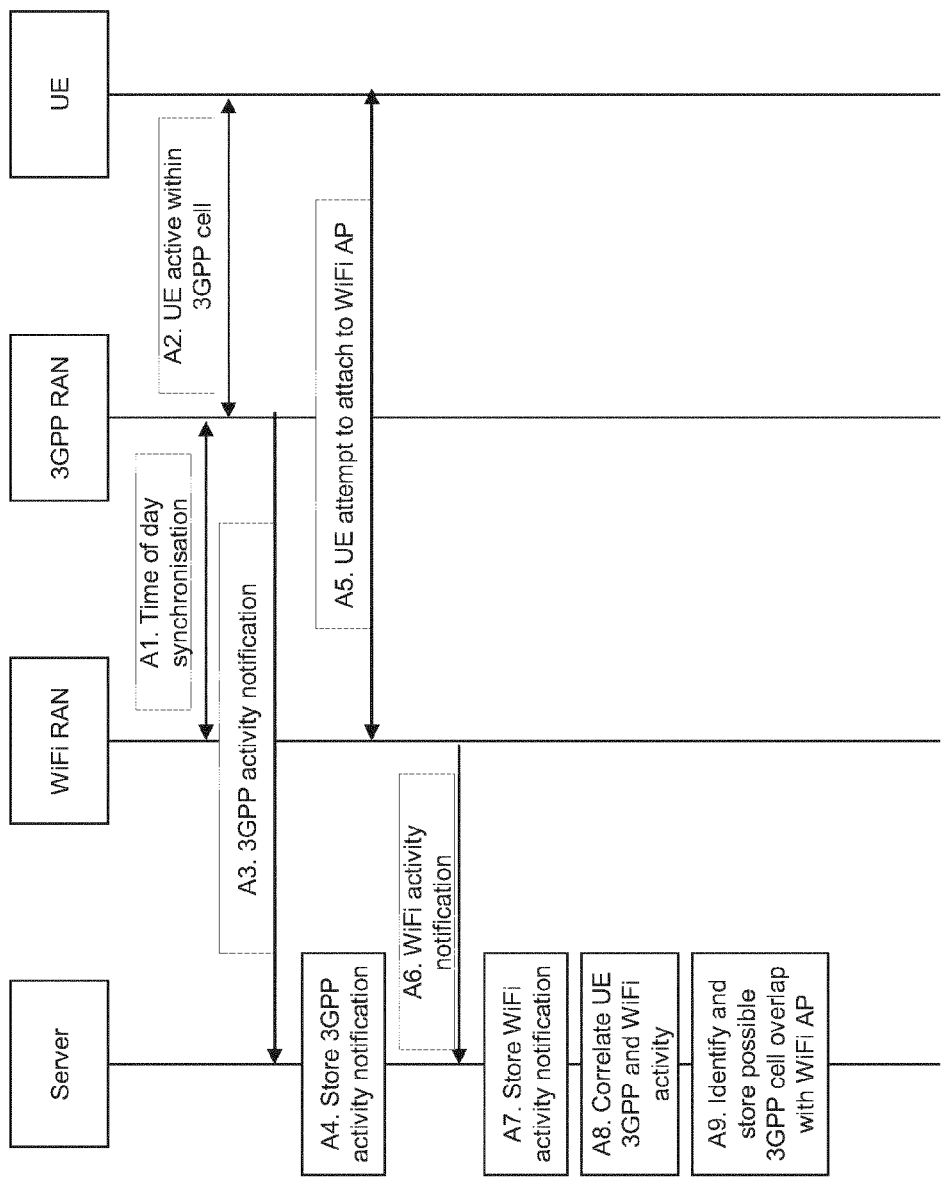
FIG. 3 illustrates an example signalling flow diagram of the generation of overlap information in accordance with the methods described herein.

In order to at least mitigate the problems identified above there will now be described a method of enabling load steering between a 3GPP RAN, such as a UTRAN or an EUTRAN, and a Wi-Fi RAN. The method involves generating overlap information associating one or more cells of the 3GPP RAN with one or more Access Points (AP) of the Wi-Fi RAN, wherein a cell of the 3GPP RAN is associated with an AP of the Wi-Fi RAN if it has been determined that the cell overlaps (i.e. is entirely or at least partially coincident) with an area covered by the Wi-Fi AP (i.e. the coverage are of the Wi-Fi AP). An off-load schedule is then determined for a cell of the 3GPP RAN, the off-load schedule indicating when an overlapping AP of the Wi-Fi RAN can reject an attempt by a device/user terminal (e.g. a user equipment (UE) or station (STA)) to attach to/associate with that Wi-Fi AP. The off-load schedule is then sent to the Wi-Fi RAN, so that the Wi-Fi RAN can use the off-load schedule to determine whether to accept or reject an attempt by a user terminal to attach to/associate with a Wi-Fi AP that overlaps with a 3GPP cell. The application of the off-load schedule by the Wi-Fi RAN can therefore be used to steer user terminals away from the Wi-Fi RAN when appropriate, thereby keeping this load on an overlapping 3GPP cell.

In order to generate the overlap information identifying one or more APs of the Wi-Fi RAN that may overlap with one or more cells of the 3GPP RAN, a server can be configured to identify when a user terminal is active in both a cell of the 3GPP RAN and an area covered by an AP of the Wi-Fi RAN. For example, the server could be configured to detect that a user terminal is connected to a 3GPP RAN and to detect when the user terminal subsequently attempts to attach to a Wi-Fi RAN. By way of further example, the server could be configured to detect when a user terminal attaches to a Wi-Fi RAN and soon afterwards detaches from a 3GPP RAN. To do so, the server can be configured to receive activity notifications from both the 3GPP RAN and the Wi-Fi RAN, wherein these activity notifications notify the server when the user terminal has been active in the respective RAN. Therefore, when the server receives an activity notification for the user terminal from both the 3GPP RAN and the Wi-Fi RAN, the server can be configured to determine if a time at which the activity of the user terminal within the 3GPP cell occurred correlates with a time at which the activity of the user terminal within the Wi-Fi AP occurred (i.e. determine if the activity occurred substantially simultaneously). If this is the case, then the server can assume that the 3GPP cell overlaps with the Wi-Fi AP.

The activity notifications received from a RAN can therefore include any of an identifier of the user terminal, an identifier for the cell or AP of the RAN in which the activity occurred, and an indication of the time at which the activity took place. With regards to the identifier of the user terminal included in the activity notifications by a RAN, this identifier should be an identifier that the server can correlate with the identifier included in an activity notification received from the other RAN. Ideally, both the 3GPP RAN and the Wi-Fi RAN would make use of the same user terminal identifier. For example, a 3GPP RAN can make use of an International Mobile Subscriber Identity (IMSI) associated with the user terminal as a user terminal identifier. A Wi-Fi RAN that authenticates a user terminal using either Extensible Authentication Protocol Method for Global System for Mobile Communications Subscriber Identity Modules, (EAP-SIM) or Extensible Authentication Protocol Method for 3rd Generation Authentication and Key Agreement (EAP-AKA) will also obtain an International Mobile Subscriber Identity (IMSI) associated with the user terminal. The IMSI could therefore be used as a user terminal identifier in the activity notifications sent by both the Wi-Fi RAN and the 3GPP RAN.

The server can be configured to store the overlap information that is generated, and to implement the determination of the off-load schedule for a 3GPP cell, the off-load schedule providing an indication of when a Wi-Fi AP that has been identified as overlapping the 3GPP cell can reject an attempt by a user terminal to attach to/associate with that Wi-Fi AP. To do so, the server can be configured to receive load information for one or more of the 3GPP cells. The server is configured to then use the received load information to determine when an overlapping Wi-Fi AP can reject an attempt by a user terminal to attach to that Wi-Fi AP. For example, this load information can be received and/or collected from each cell regularly/periodically over a period of time (e.g. of days or weeks) so that a pattern for the load experienced by each cell can be established. This pattern can then be used to determine when the load on a particular cell is expected to be high and/or low in relation to the capacity of that cell, and thereby determine when traffic should be steered away from that cell. The server can be configured to send the determined off-load schedule to the Wi-Fi RAN.

Following delivery of an off-load schedule by the server, the Wi-Fi RAN can use the off-load schedule to determine whether to accept or reject an attempt by a user terminal to attach to/associate with a Wi-Fi AP. For example, the server could send the off-load schedule to a Wi-Fi Access Controller (AC) of the Wi-Fi RAN. The Wi-Fi AC could then use the off-load schedule when a user terminal attempts to attach to/associate with a Wi-Fi AP to determine whether to accept or reject the attempt to attach/associate with to the Wi-Fi AP. For example, the Wi-Fi AC control could use the off-load schedule when the Wi-Fi AP contacts the Wi-Fi AC in order to authenticate the user terminal. Alternatively, the Wi-Fi AC could receive the off-load schedule from the server, and then distribute the off-load schedule to one or more Wi-Fi APs to which the off-load schedule is relevant (i.e. to those Wi-Fi APs that overlap with the relevant 3GPP cell). Each of these Wi-Fi APs could then apply the off-load schedule locally when a user terminal attempts to attach to a Wi-Fi AP. As a further alternative, the server itself could distribute the off-load schedule to one or more Wi-Fi APs to which the off-load schedule is relevant, such that the Wi-Fi APs could then apply the off-load schedule locally.

When the Wi-Fi RAN rejects an attempt by a user terminal to attach to/associate with a Wi-Fi AP based on the off-load schedule, the Wi-Fi RAN can be configured to send an off-load notification to the server. For example, this off-load notification could be sent to the server by either a Wi-Fi AC or a Wi-Fi AP that determines that the user terminal should be rejected. The server can then use the information provided by the off-load notification to update one or both of the off-load schedule and the overlap information. For example, following receipt of an off-load notification, the server can be configured to determine if the rejected user terminal is active within a 3GPP cell that has been identified as overlapping with the Wi-Fi AP that rejected the attempt to attach, and to update the overlap information accordingly. In particular, if the server receives an activity notification for the rejected user terminal from a 3GPP cell, the server can determine if the overlap information associates the 3GPP cell with the Wi-Fi AP that rejected the user terminal. If the overlap information does identify the 3GPP cell as overlapping with the Wi-Fi AP, then the overlap information will not require updating. However, if the overlap information does not identify the 3GPP cell as overlapping with the Wi-Fi AP, then this could indicate that the overlap information is incomplete, and that the overlap information should be updated to identify the 3GPP cell as overlapping with the Wi-Fi AP.

FIG. 1 is a flow diagram illustrating an example of the procedure implemented by a server in order to implementing load steering between a 3GPP RAN and a Wi-Fi RAN as described above. The steps performed are as follows:

S101. The server periodically/regularly receives load information from one or more cells of the 3GPP RAN. The server stores the 3GPP cell load information received over a period of time (e.g. of days or weeks) so that a pattern for the load experienced by each 3GPP cell can be established.

S102. The server also receives activity notifications from both the 3GPP RAN and the Wi-Fi RAN relating to the activity of user terminals within the cells/APs of the respective RANs. The server stores the received activity notifications.

S103. The server then uses the activity notifications to generate overlap information for the 3GPP cells and the Wi-Fi APs. To do so, the server can identify when a user terminal is active in both a 3GPP cell and a Wi-Fi AP by correlating a time at which the activity within the 3GPP cell occurred with a time at which the activity within the Wi-Fi AP occurred. The server may continuously attempt to generate overlap information, such that it will attempt to correlate activity notifications as soon as they are received. Alternatively, the server may periodically attempt to generate overlap information, and will therefore attempt to correlate activity notifications that it has previously stored. The overlap information will therefore be updated over time as more activity notifications are received.

S104. At some time after overlap information has been generated, the server determines an off-load schedule for a 3GPP cell, the off-load schedule providing an indication of when a Wi-Fi AP that has been identified as overlapping the 3GPP cell can reject an attempt by a user terminal to attach to that Wi-Fi AP. To do so, the server uses the 3GPP cell load information received from the 3GPP RAN (e.g. received over a period of days or weeks) to establish a pattern for the expected load on the 3GPP cell.

S105. The server then sends the off-load schedule to the Wi-Fi RAN.

FIG. 2 is a flow diagram illustrating an example of the procedure implemented by a Wi-Fi RAN in order to implementing load steering between a 3GPP RAN and the Wi-Fi RAN as described above. This procedure can be implemented by either a Wi-Fi AC or a Wi-Fi AP. The steps performed are as follows:

S201. The Wi-Fi RAN sends activity notifications to the server relating to the activity of user terminals at the AP of the Wi-Fi RAN. The activity notifications can include any of an identifier of w user terminal, an identifier for an AP of the Wi-Fi RAN, an indication of the time at which the activity took place, and an indication of the type of activity. These activity notifications are sent to the server in order to allow the server to generate overlap information identifying 3GPP cells that overlap with one or more Wi-Fi APs.

S202. Subsequently, the Wi-Fi RAN receives, from the server, an off-load schedule that is relevant to one or more of the Wi-Fi APs. The Wi-Fi RAN stores the received off-load schedule for later use.

S203. A user terminal then attempts to attach to/associate with a Wi-Fi AP for which the off-load schedule is relevant. The Wi-Fi RAN therefore uses the off-load schedule to determine whether to accept or reject the user terminals attempt to attach/associate.

S204. If the user terminal is rejected, the Wi-Fi RAN sends an off-load notification to the server. The off-load notification can include any of an identifier of the user terminal, an identifier for the AP of the Wi-Fi RAN, and an indication of the time at which the off-load took place.

S205. If the user terminal is accepted, the Wi-Fi RAN can send a further activity notification to the server (e.g. due to the activity at the AP of the attached/associated user terminal).

FIG. 3 illustrates an example signalling flow diagram of the generation of overlap information in accordance with the methods described above. The steps performed are as follows:

A1. The Wi-Fi RAN and the 3GPP RAN cooperate in order to perform a time of day synchronisation. This time of day synchronisation allows the server to rely on any time information included in any activity notifications received from the RANs when attempting to correlate user terminal activity in each RAN.

A2. The user terminal is active within a 3GPP cell.

A3. As a result of the activity of the user terminal within the 3GPP cell, the 3GPP RAN sends an activity notification to the server. This activity notification typically includes an identifier for the user terminal, an identifier for the 3GPP cell in which the user terminal is active, and an indication of the time at which the activity of the user terminal within the 3GPP cell occurred. The activity notification can also include an indication of the type of activity that has occurred in relation to the user terminal.

A4. The server stores the information provided by the 3GPP activity notification.

A5. The user terminal then attempts to attach to an AP of the Wi-Fi RAN.

A6. As a result of the attempt by the user terminal to attach to the Wi-Fi AP, the Wi-Fi RAN sends an activity notification to the server. This activity notification also typically includes an identifier for the user terminal, an identifier for the Wi-Fi AP to which the user terminal has attempted to attach, and an indication of the time at which the attempt to attach to the Wi-Fi AP occurred. The activity notification can also include an indication of the type of activity that has occurred in relation to the user terminal (i.e. an attempt to attach).

A7. The server stores the information provided by the Wi-Fi activity notification.

A8. The server processes the activity notifications to identify any possible overlap between 3GPP cells and Wi-Fi APs. The server may process the activity notifications as soon as they are received, such that it continually attempts to correlate the received activity notification with stored activity notifications. Alternatively, the server may periodically process the activity notifications, such that it periodically attempts to correlate the stored activity notifications. In this example, the server determines that it has received activity notifications from both the 3GPP RAN and the Wi-Fi RAN that relate to the same user terminal, and correlates the times at which the activity within each of the RANs occurred. In doing so, the server determines that the activity within each RAN in relation to this user terminal occurred substantially simultaneously.

A9. As a result of having determined that the activity within each RAN in relation to this user terminal occurred substantially simultaneously, the server may conclude that the coverage area of the 3GPP cell may overlap with the coverage area of the Wi-Fi AP. The server may identify the 3GPP cell and the Wi-Fi AP as overlapping after a single occurrence of correlated activity within the cell and the AP. Alternatively, the server may be configured to only identify the 3GPP cell and the Wi-Fi AP as overlapping after a threshold number of occurrences of correlated activity within the cell and the AP have been recorded. As a further alternative, the server may be configured to require network operator approval. To do so, the server can be configured to provide an indication of the occurrence of correlated activity to the network operator, after each occurrence of correlated activity within the cell and the AP, and to receive an input in response to this indication as to whether the cell and the AP should be identified as overlapping. When the server has identified that a 3GPP cell and a Wi-Fi AP may overlap, the server stores this overlap information for use in determining an off-load schedule.

Figure 4:
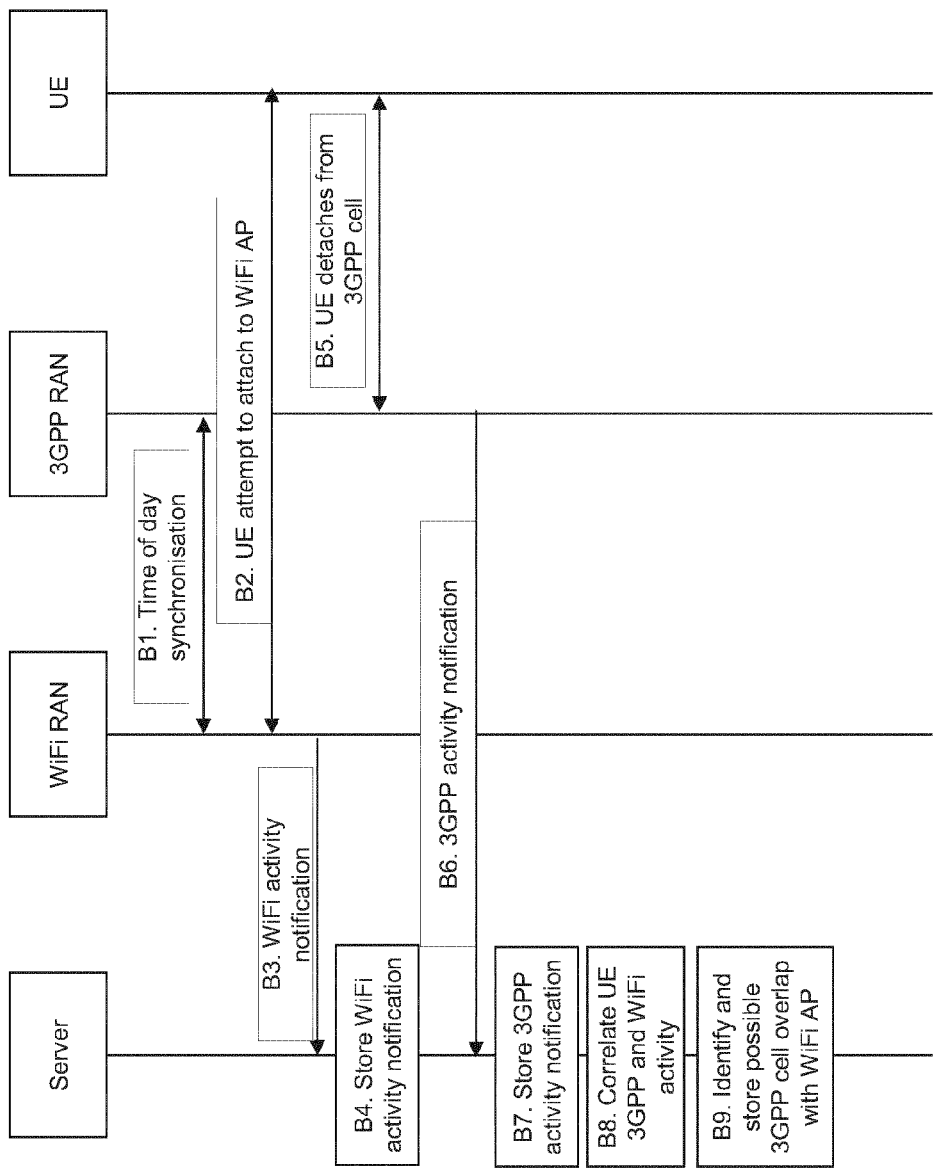
FIG. 4 illustrates a further example signalling flow diagram of the generation of overlap information in accordance with the methods described herein.

FIG. 4 illustrates a further example signalling flow diagram of the generation of overlap information in accordance with the methods described above. The steps performed are as follows:

B1. The Wi-Fi RAN and the 3GPP RAN cooperate in order to perform a time of day synchronisation. This time of day synchronisation allows the server to rely on any time information included in any activity notifications received from the RANs when attempting to correlate user terminal activity in each RAN.

B2. The user terminal attempts to attach to an AP of the Wi-Fi RAN.

B3. As a result of the attempt by the user terminal to attach to the Wi-Fi AP, the Wi-Fi RAN sends an activity notification to the server. This activity notification typically includes an identifier for the user terminal, an identifier for the Wi-Fi AP to which the user terminal has attempted to attach, and an indication of the time at which the attempt to attach to the Wi-Fi AP occurred. The activity notification can also include an indication of the type of activity that has occurred in relation to the user terminal (i.e. an attempt to attach).

B4. The server stores the information provided by the Wi-Fi activity notification.

B5. As a result of the attempt by the user terminal to attach to the Wi-Fi AP, the user terminal detaches from the 3GPP cell.

B6. As a result of the detachment of the user terminal from the 3GPP cell, the 3GPP RAN sends an activity notification to the server. This activity notification also typically includes an identifier for the user terminal, an identifier for the 3GPP cell in which the user terminal is active, and an indication of the time at which the activity of the user terminal within the 3GPP cell occurred. The activity notification can also include an indication of the type of activity that has occurred in relation to the user terminal B7. The server stores the information provided by the 3GPP activity notification.

B8. The server processes the activity notifications to identify any possible overlap between 3GPP cells and Wi-Fi APs. The server may process the activity notifications as soon as they are received, such that it continually attempts to correlate the received activity notification with stored activity notifications. Alternatively, the server may periodically process the activity notifications, such that it periodically attempts to correlate the stored activity notifications. In this example, the server determines that it has received activity notifications from both the 3GPP RAN and the Wi-Fi RAN that relate to the same user terminal, and correlates the times at which the activity within each of the RANs occurred. In doing so, the server determines that the activity within each RAN in relation to this user terminal occurred substantially simultaneously.

B9. As a result of having determined that the activity within each RAN in relation to this user terminal occurred substantially simultaneously, the server may conclude that the coverage area of the 3GPP cell may overlap with the coverage area of the Wi-Fi AP. The server may identify the 3GPP cell and the Wi-Fi AP as overlapping after a single occurrence of correlated activity within the cells. Alternatively, the server may be configured to only identify the 3GPP cell and the Wi-Fi AP as overlapping after a threshold number of occurrences of correlated activity within the cells have been recorded. As a further alternative, the server may be configured to require network operator approval. To do so, the server can be configured provide an indication of the occurrence of correlated activity to the network operator, after each occurrence of correlated activity within the cell/AP, and to receive an input in response to this indication as to whether the cell/AP should be identified as overlapping. When the server has identified that a 3GPP cell and a Wi-Fi AP may overlap, the server stores this overlap information for use in determining an off-load schedule.

Figure 5:
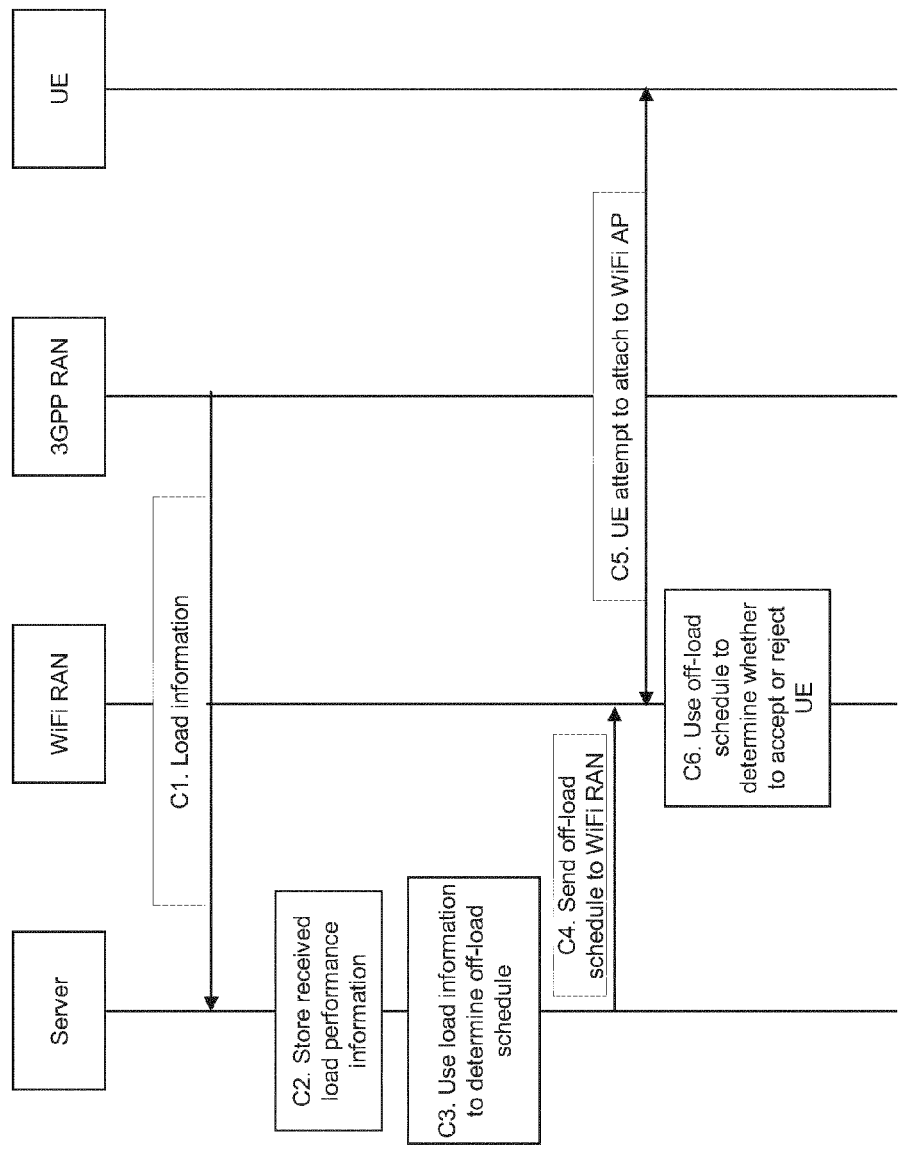
FIG. 5 illustrates an example signalling flow diagram of the determination and use of an off-load schedule accordance with the methods described herein.

FIG. 5 illustrates an example signalling flow diagram of the determination and use of an off-load schedule for load steering in accordance with the methods described above. The steps performed are as follows:

C1. The server obtains load information from the 3GPP cells of the 3GPP RAN. This load performance information can be received and/or collected from each 3GPP cell periodically over a period of time. For example, the load information could be obtained from each of the 3GPP cells with a period of 15 minutes to an hour over a period of days or weeks.

C2. The server stores the load information obtained from the 3GPP RAN.

C3. The server then uses the stored load information, together with the overlap information, to determine an off-load schedule for a 3GPP cell, wherein the off-load schedule provides an indication of when a Wi-Fi AP that has been identified as overlapping the 3GPP cell can reject an attempt by a user terminal to attach to that Wi-Fi AP. To do so, the server makes use of the historic load information to establish a pattern for the load on any of the 3GPP cells. Such patterns can then be used to determine when the load performance on a particular cell is expected to be high and/or low in relation to the capacity of that cell, and thereby to determine when traffic should be steered away from that cell. For example, the off-load schedule generated by the server may effectively specify "The load on the 3GPP cell is expected to be low between 18:00 and 06:00 and between 13:00 and 15:00".

C4. The off-load schedule is then sent to the Wi-Fi RAN. For example, the server could send that off-load schedule to a management system of the Wi-Fi RAN for distribution to the appropriate Wi-Fi APs.

C5. Subsequently, a user terminal attempts to attach to a Wi-Fi AP to which the off-load schedule is relevant (i.e. that overlaps with the 3GPP cell to which the off-load schedule relates).

C6. The Wi-Fi RAN therefore makes use of the off-load schedule to determine whether to accept or reject the user terminal. For example, the Wi-Fi RAN determines the current time (i.e. at which the attempt to attach is taking place), compares this to the off-load schedule, and determines the current load on the Wi-Fi AP. The Wi-Fi RAN can then determine whether or not the user terminal should use the 3GPP RAN or the Wi-Fi RAN based on the expected load on the 3GPP RAN (as indicated by the off-load schedule) and the current load on the Wi-Fi RAN.

Whilst it is noted that the off-load schedule is based on historic load information, and that it cannot be guaranteed that the future load and on a cell will be the same or similar to that indicated by this historic data, the off-load schedule can be updated using continual updates of the load information that are received from the 3GPP RAN. This continual maintenance/updating of the off-load schedule ensures that the distribution of load between the 3GPP RAN and the Wi-Fi RAN is optimised.

Figure 6:
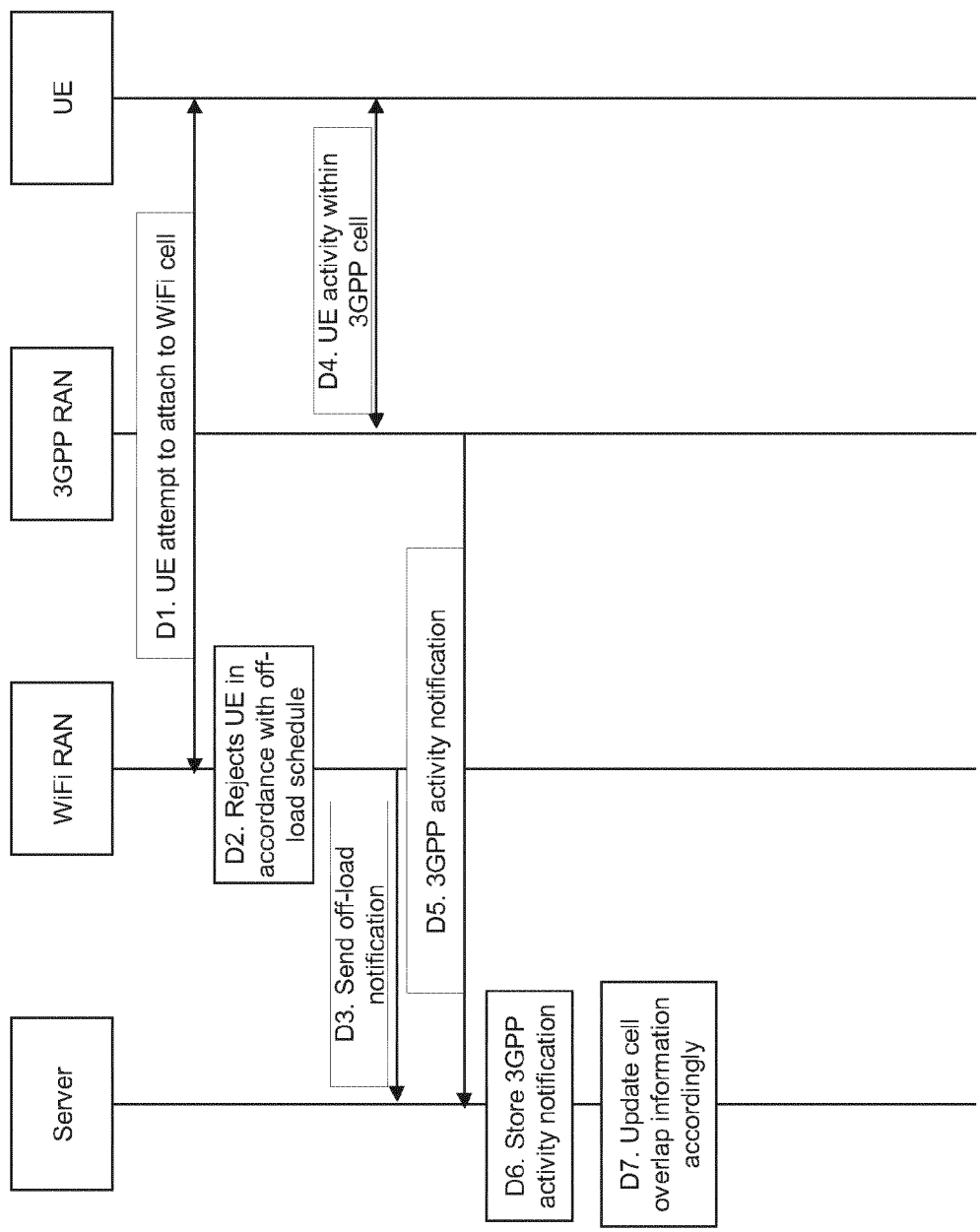
FIG. 6 illustrates an example signalling flow diagram of the maintenance of overlap information in accordance with the methods described herein.

FIG. 6 illustrates an example signalling flow diagram of the maintenance/update of both an off-load schedule and overlap information in accordance with the methods described above. The steps performed are as follows:

D1. A user terminal attempts to attach to/associate with a Wi-Fi AP to which an off-load schedule applies (i.e. that overlaps with the 3GPP cell to which the off-load schedule relates).

D2. The Wi-Fi RAN therefore applies the off-load schedule to determine whether to accept or reject the user terminal and, in this example, determines that the user terminal should be rejected.

D3. The Wi-Fi RAN then sends an off-load notification to the server in order to notify the server that the Wi-Fi AP has rejected an attempt by the user terminal to attach to the Wi-Fi AP based on the off-load schedule. This off-load notification typically includes an identifier for the user terminal, an identifier for the Wi-Fi AP to which the user terminal has attempted to attach, and an indication of the time at which the attempt to attach to the Wi-Fi AP occurred.

D4. Subsequently, some activity of the user terminal occurs within a 3GPP cell.

D5. As a result of the activity of the user terminal within the 3GPP cell, the 3GPP RAN sends an activity notification to the server. This activity notification typically includes an identifier for the user terminal, an identifier for the 3GPP cell in which the user terminal is active, and an indication of the time at which the activity of the user terminal within the 3GPP cell occurred. The activity notification can also include an indication of the type of activity that has occurred in relation to the user terminal.

D6. The server stores the information provided by the 3GPP activity notification.

D7. The server can then use the information provided by the off-load notification together with the information in the 3GPP activity notification to update the overlap information. To do so, when the server receives the activity notification for the rejected user terminal from the 3GPP cell, the server determines if the cell overlap information identifies the 3GPP cell as overlapping with the Wi-Fi AP that rejected the user terminal. If the overlap information does identify the 3GPP cell as overlapping with the Wi-Fi AP, then the overlap information will not require updating. However, if the overlap information does not identify the 3GPP cell as overlapping with the Wi-Fi AP, then this could indicate that the overlap information is incomplete, and that the overlap information may need to be updated to identify the 3GPP cell as overlapping with the Wi-Fi AP.

In addition, following an off-load, the server can be provided with information relating to the performance of the user terminal within the 3GPP RAN. The server can then use this performance information to determine if the performance of the user terminal within the 3GPP RAN has downgraded compared to the performance of the user terminal in the Wi-Fi RAN. In other words, the server can determine if the off-load decision was correct, and can update the off-load schedule accordingly. For example, if the server was to determine that the off-load resulted in a downgrade of the performance of the user terminals radio link, then the server could at least temporarily remove the association between the 3GPP cell and the Wi-Fi AP from the overlap information, thereby preventing other user terminals from being offloaded to that 3GPP cell.

FIG. 7 illustrates schematically an embodiment of a server 10 configured to implement the methods described above. The server can be implemented as a combination of computer hardware and software and comprises a receiver 11, a transmitter 12, a processor 13, and a memory 14. The memory 14 stores the various programs/executable files that are implemented by the processor 13, and also provides a storage unit for any required data. For example, the memory can store the load and/or performance information received from the 3GPP RAN and the Wi-Fi RAN, the information received in any activity and off-load notifications, and the current off-load schedules. The programs/executable files stored in the memory 14, and implemented by the processor 13, include but are not limited to an overlap information generation unit, and an off-load schedule determination unit that implement the methods described above. The functionality of the server described herein can be provided by any functional entity that is capable of communicating with both the 3GPP RAN and the Wi-Fi RAN. For example, such a functional entity could be located in the Operational Support System (OSS) of the network provider.

FIG. 8 illustrates schematically an embodiment of an entity of a Wi-Fi RAN 20 configured to implement the methods described above. The Wi-Fi entity 20 can be implemented as a combination of computer hardware and software and comprises a receiver 21, a transmitter 22, a processor 23, and a memory 24. The memory 24 stores the various programs/executable files that are implemented by the processor 23, and also provides a storage unit for any required data. For example, the memory 24 can store one or more off-load schedules received from a server. The programs/executable files stored in the memory 24, and implemented by the processor 23, include but are not limited to a load and/or performance monitoring and reporting unit, an activity notification unit, an off-load determination unit, and an off-load notification unit that implement the methods described above. The Wi-Fi entity could be provided by any of a Wi-Fi AC and a Wi-Fi AP.

The methods and apparatus described above provide a straightforward mechanism by which load steering between a 3GPP RAN and a Wi-Fi RAN can be implemented using an off-load schedule that is based on the expected load on the cells of a 3GPP RAN, and that is applied by the Wi-Fi RAN. In addition, these methods and apparatus provide a straightforward mechanism by which overlap information can be determined as an indication of the relative locations of the cells of a 3GPP RAN and the APs of a Wi-Fi RAN, thereby enabling the load steering to be applied between the appropriate cells/APs. Furthermore, these methods and apparatus also provide feedback mechanisms that enables both the off-load schedule and overlap information to be continually updated and improved.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, in the illustrated example signalling flow diagrams described above, only those messages and headers that are of particular relevance are shown. Those skilled in the art will be aware those messages and headers that have not been included in this illustration. In addition, whilst the above described embodiments specifically relate to heterogeneous networks comprised of at least a 3GPP RAN and a Wi-Fi RAN, the principles of the methods described herein are equally applicable to heterogeneous networks that comprise other radio access technologies; such as cdmaOne and CDMA2000.

The invention claimed is:

1. A method of enabling load steering between a 3rd Generation Partnership Project (3GPP) Radio Access Network (RAN) and a Wi-Fi RAN, the method comprising, at a server:
generating overlap information associating one or more cells of the 3GPP RAN with one or more Access Points (APs) of the Wi-Fi RAN, wherein a cell of the 3GPP RAN is associated with an AP of the Wi-Fi RAN if it is determined that the cell overlaps with an area covered by the AP of the Wi-Fi RAN;
determining an off-load schedule for the cell of the 3GPP RAN, the off-load schedule indicating when an overlapping AP of the Wi-Fi RAN can reject an attempt by a user terminal to attach to the overlapping AP of the Wi-Fi RAN; and
sending the off-load schedule to the Wi-Fi RAN,
wherein the generating overlap information associating the one or more cells of the 3GPP RAN with the one or more APs of the Wi-Fi RAN comprises:
identifying when the user terminal is active in both the cell of the 3GPP RAN and the area covered by the AP of the Wi-Fi RAN, wherein the identifying when the user terminal is active comprises:
receiving an activity notification from the 3GPP RAN relating to activity of the user terminal within the 3GPP cell;
receiving an activity notification from the Wi-Fi RAN relating to activity of the user terminal within the area covered by the AP of the Wi-Fi RAN; and
correlating a time at which the activity within the 3GPP cell occurred with a time at which the activity at the AP of the Wi-Fi RAN occurred.

2. The method as claimed in claim 1, further comprising: receiving load information from the cell of the 3GPP RAN, and using the received load information when determining the off-load schedule for the 3GPP cell.

3. The method as claimed in claim 1, further comprising: receiving an off-load notification from the Wi-Fi RAN indicating that the overlapping AP of the Wi-Fi RAN has rejected the attempt by the user terminal to attach to the overlapping AP of the Wi-Fi RAN.

4. The method as claimed in claim 3, further comprising: upon receiving the off-load notification, receiving performance information relating to performance of the rejected user terminal within the 3GPP cell, and using the received performance information to update the overlap information accordingly.

5. The method as claimed in claim 3, further comprising: upon receiving a further activity notification from the 3GPP RAN relating to activity of the rejected user terminal within the 3GPP cell, determining if the overlap information associates the 3GPP cell with the overlapping AP of the Wi-Fi RAN that rejected the attempt to attach; and
updating the overlap information accordingly.

6. A method of implementing load steering between a 3rd Generation Partnership Project (3GPP) Radio Access Network (RAN) and a Wi-Fi RAN, the method comprising, at an entity of the Wi-Fi RAN:
receiving, from a server, an off-load schedule that is applicable to an Access Point (AP) of the Wi-Fi RAN, the off-load schedule indicating when the AP of the Wi-Fi RAN can reject an attempt by a user terminal to attach to the AP of the Wi-Fi RAN, wherein the server is configured to generate overlap information associating one or more cells of the 3GPP RAN with the one or more APs of the Wi-Fi RAN, wherein generating the overlap information associating one or more cells of the 3GPP RAN comprises:
identifying when the user terminal is active in both the cell of the 3GPP RAN and an area covered by the AP of the Wi-Fi RAN, wherein the identifying when the user terminal is active comprises:
receiving an activity notification from the 3GPP RAN relating to activity of the user terminal within the 3GPP cell;
receiving an activity notification from the Wi-Fi RAN relating to activity of the user terminal at the AP of the Wi-Fi RAN; and
correlating a time at which the activity within the 3GPP cell occurred with a time at which the activity at the AP of the Wi-Fi RAN occurred; and
when the user terminal attempts to attach to the AP of the Wi-Fi RAN, using the off-load schedule to determine whether to accept or reject the user terminal.

7. The method as claimed in claim 6, further comprising: prior to receiving the off-load schedule that is applicable to the AP of the Wi-Fi RAN, when the user terminal attempts to attach to the AP of the Wi-Fi RAN, generating and sending an activity notification to the server.

8. The method as claimed in claim 6, further comprising: if the user terminal is rejected based on the off-load schedule, generating and sending an off-load notification indicating that the AP of the Wi-Fi RAN has rejected the attempt to attach to the AP of the Wi-Fi RAN.

9. The method as claimed in claim 6, further comprising: if the user terminal is accepted, generating and sending an activity notification to the server indicating that the AP of the Wi-Fi RAN has accepted the attempt to attach to the AP of the Wi-Fi RAN.

10. A server configured to enable load steering between a 3rd Generation Partnership Project (3GPP) Radio Access Network (RAN) and a Wi-Fi RAN, the server comprising:
a processor configured to generate overlap information associating one or more cells of the 3GPP RAN with one or more Access Points (AP) of the Wi-Fi RAN, wherein a cell of the 3GPP RAN is associated with an AP of the Wi-Fi RAN if it is determined that the cell overlaps with an area covered by the AP of the Wi-Fi RAN;
the processor being further configured to determine an off-load schedule for the cell of the 3GPP RAN, the off-load schedule indicating when an overlapping AP of the Wi-Fi RAN can reject an attempt by a user terminal to attach to the overlapping AP of the Wi-Fi RAN;
a transmitter configured to send the off-load schedule to the Wi-Fi RAN; and
a receiver configured to receive an activity notification from the 3GPP RAN relating to activity of the user terminal within the 3GPP cell and to receive an activity notification from the Wi-Fi RAN relating to activity of the user terminal within the area covered by the AP of the Wi-Fi RAN;
wherein the processor is further configured to correlate a time at which the activity within the 3GPP cell occurred with a time at which the activity at the area covered by the AP of the Wi-Fi RAN cell occurred.

11. The server as claimed in claim 10, wherein the processor is configured to generate overlap information by identifying when the user terminal may Ms active in both the cell of the 3GPP RAN and at the area covered by the AP cell of the Wi-Fi RAN.

12. The server as claimed in claim 10, wherein the receiver is further configured to receive load information from the cell of the 3GPP RAN, and the processor is further configured to use the received load information when determining the off-load schedule for the 3GPP cell.

13. The server as claimed in claim 10, wherein the receiver is further configured to receive an off-load notification from the Wi-Fi RAN indicating that the overlapping AP of the Wi-Fi RAN has rejected the attempt by the user terminal to attach to the overlapping AP of the Wi-Fi RAN based on the off-load schedule.

14. The server as claimed in claim 13, wherein the receiver is further configured to receive performance information relating to performance of the rejected user terminal within the 3GPP cell, and the processor is configured to use the received performance information to update the overlap information accordingly.

15. The server as claimed in claim 13, wherein the receiver is further configured to receive a further activity notification from the 3GPP RAN relating to activity of the rejected user terminal within the 3GPP cell, and the processor is further configured to determine if the overlap information associates the 3GPP cell with the overlapping AP of the Wi-Fi RAN that rejected the attempt to attach, and to update the overlap information accordingly.

16. An entity of a Wi-Fi Radio Access Network (RAN) configured to implement load steering between a 3rd Generation Partnership Project (3GPP) RAN and the Wi-Fi RAN, the entity comprising:
a receiver configured to receive an off-load schedule from a server that is applicable to an Access Point (AP) of the Wi-Fi RAN, the off-load schedule indicating when the AP of the Wi-Fi RAN can reject an attempt by a user terminal to attach to the AP of the Wi-Fi RAN, wherein the server is configured to generate overlap information associating one or more cells of the 3GPP RAN with the one or more APs of the Wi-Fi RAN, wherein the server comprises a receiver configured to receive an activity notification from the 3GPP RAN relating to activity of the user terminal within the 3GPP cell and to receive an activity notification from the Fi RAN relating to activity of the user terminal within an area covered by an AP of the Wi-Fi RAN, and the server further comprises a processor configured to correlate a time at which the activity within the 3GPP cell occurred with a time at which the activity at the area covered by the AP of the Wi-Fi RAN cell occurred; and
a processor configured to use the off-load schedule to determine whether to accept or reject an attempt by the user terminal to attach to the AP of the Wi-Fi RAN.

17. The entity as claimed in claim 16, comprising a transmitter.

18. The entity as claimed in claim 17, wherein the processor is configured to generate an activity notification when the user terminal attempts to attach to the AP of the Wi-Fi RAN, and the transmitter is configured to send the activity notification to the server.

19. The entity as claimed in claim 17, wherein the processor is configured to generate an off-load notification if the user terminal is rejected based on the off-load schedule, the off-load notification indicating that the AP of the Wi-Fi RAN has rejected the attempt to attach, and the transmitter is configured to send the off-load notification to the server.

20. The entity as claimed in claim 17, wherein processor is configured to generate an activity notification if the user terminal is accepted, the activity notification indicating that the AP of the Wi-Fi RAN has accepted the attempt to attach, and the transmitter is configured to send the activity notification to the server.

* * * * *